United States Patent [19]

Afshar

[11] Patent Number: 4,836,424
[45] Date of Patent: Jun. 6, 1989

[54] CONTAINER CLOSURE AND DISPENSER FOR GRANULAR MATERIALS

[76] Inventor: Mohammad M. Afshar, Lagasca 90, 28006 Madrid, Spain

[21] Appl. No.: 167,493

[22] Filed: Mar. 14, 1988

[30] Foreign Application Priority Data

Mar. 18, 1987 [ES] Spain .............................. 8700909[U]

[51] Int. Cl.[4] ............................................. G01F 11/00
[52] U.S. Cl. ..................................... 222/279; 222/361
[58] Field of Search ................ 221/264, 266; 222/153, 222/361–364, 366, 278, 279, 288, 339, 306

[56] References Cited

U.S. PATENT DOCUMENTS

| | | | |
|---|---|---|---|
| 1,880,823 | 10/1932 | Cooper | 222/361 |
| 2,601,353 | 6/1952 | Woodward | 222/153 |
| 3,249,266 | 5/1966 | Cole et al. | 222/362 |
| 3,991,908 | 11/1976 | Thomas et al. | 222/153 |
| 4,557,404 | 12/1985 | Solomon | 222/361 |

FOREIGN PATENT DOCUMENTS 706685  4/1954  United Kingdom ................ 222/153

Primary Examiner—H. Grant Skaggs
Attorney, Agent, or Firm—William H. Maxwell

[57] ABSTRACT

A closure and dispenser combination, the closure having an exterior mounting means for the separate dispenser stored within a seal between the closure and container to store the dispenser within the container for subsequent removal therefrom and installation on said mounting means aligned with an opening in the closure, the dispenser having a slide with a product transfering chamber shiftable from the closure opening to an offset opening in the dispenser to discharge the product.

7 Claims, 2 Drawing Sheets

CONTAINER CLOSURE AND DISPENSER FOR GRANULAR MATERIALS

BACKGROUND OF THE INVENTION

Food products such as instant coffee, not to exclude other powdered and granulated products such as milk, cocoa, sugar, etc., are merchandized in containers made of glass and plastic with screw-on lids. Heretofore, such foods have been dispensed from their containers by the spoonful, for example a teaspoonful at a time when the lid is removed. Also, lids with pouring spouts have been used in the past, but they have not measured the product being dispensed. Therefore, it is a general object of this invention to provide a Container Closure and Dispenser For Grannular Materials and the like, adapted to measure out the contents of the container in which the materials are merchanized and from which they are used.

Heretofore, dispensing lids for containers of powdered and granulated or ground materials, such as food products, have been special devices applied to the product container after the lid is removed and disposed of. Since such dispensing devices are space consuming when applied to the top of a container, their presence in merchanizing has not been acceptable. However, there is most always a shallow space left within the container between the lid and the contents, when the container is filled, and it is this space which is advantageously employed herein to accommodate a dispenser during the merchandizing process. Therefore, it is an object of this invention to temporarily place the dispenser within the container without reducing the contents normally stored therein.

Heretofore, containers of the type under consideration have either been provided with lids or dispenser devices, but not such as to be converted from one to the other, it being and object of this invention to provide a container closure-dispenser combination wherein the dispenser device is accommodated within the container during merchandizing and then reapplied to the exterior by the user. This combination of a closure and a dispenser involves accommodation of the dispenser within the closure and container during merchanizing or shipping etc., followed by the application of the dispenser to the closure at the exterior of the container for its dispensary use.

Instant coffee and other like food products are measured out two cubic centimeters at a time, or a teaspoonful at a time, as may be required. Therefore, it is an object of this invention to provide a dispenser to measure out a certain quantity of product for each cycle of its operation. Accordingly for example, the dispenser herein disclosed is cooperatively combined with the closure of the container to measure out one teaspoonful per operation.

SUMMARY

This invention relates to a closure and dispenser for food products such as instant coffee, and the like, which is a powdered product to be dispensed in a measured amount, such as a teaspoonful at a time. Such products are merchandized in containers with screw-on lids, leaving a shallow space within the top of the container when it is filled to a normal level. The dispenser is occluded from view by a normal sized closure or lid which does not increase the size of the container, and so that the merchandizing can be carried out in the usual accepted manner. However, the dispenser is later acessible to the user and applied to the top of the closure which is then reapplied to the container to close the same. Operation of the dispenser involves inverting the container and closure assembly followed by shifting a measuring box which thereby drops a measured amount of product. The closure is sealed to the container during merchandizing, shipping and shelf display etc., and a break-out portion of the closure gains access to the contents for operation of the dispenser installed atop the closure.

The foregoing and various other object and features of this invention will be apparent and fully understood from the following detailed description of the typical preferred form and application thereof, throughout which description reference is made to the accompanying drawings.

THE DRAWINGS

Figure 1:
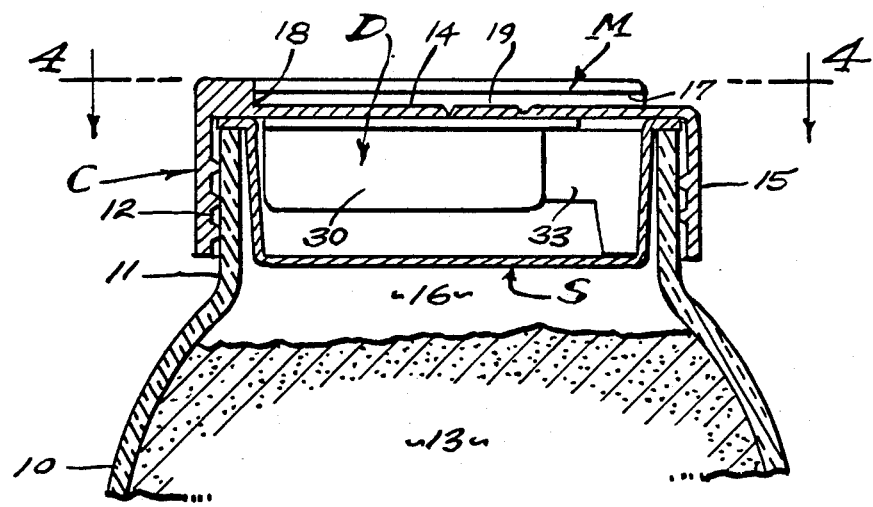
FIG. 1 is a sectional view of the top portion of a container with the closure and dispenser combination installed in the merchandizing mode, with the dispenser accommodated within the top portion of the container and sealed by the closure.
Figure 3:
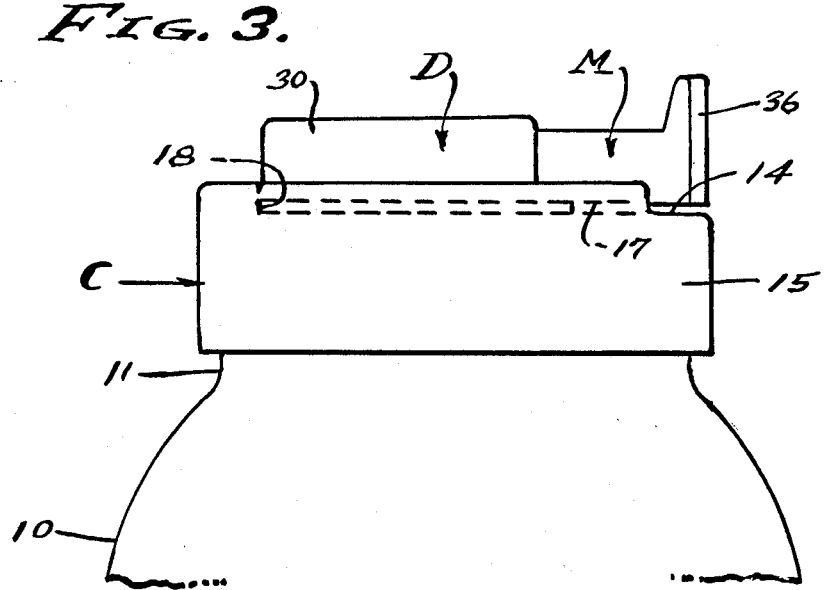
FIG. 3 is an elevational view similar to FIG. 1, and shows the dispenser installed atop the closure ready for operation.
Figure 6:
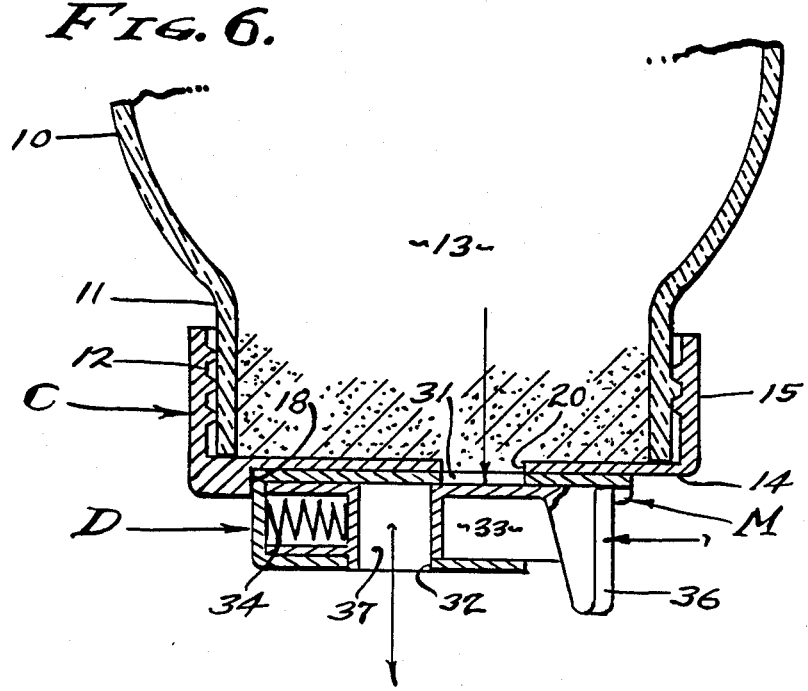

And, FIG. 6 is sectional view similar to FIGS. 1 and 3, and shows the closure and dispenser combination inverted and with the dispenser operated in the dispensing mode.

PREFERRED EMBODIMENT

Referring now to the drawings, this invention involves the combination of a closure C and a dispenser D for a food container or the like. The container is shown as a glass or plastic jar having a cylindrical body 10 and an open neck 11 which is threaded at 12. The neck opening is in a plane normal to the turning axis of the threads which receive a lid or closure C in the usual manner. The contents is indicated at 13 as a powdered food product or the like.

The closure C is essentially a normal screw-on cap that threads over and onto the neck 11, and is comprised of a disc-shaped top 14 with a depending skirt 15 that is internally threaded. As shown, the underside of the top 14 seats onto the top open end of neck 11 to close the container, with the contents 13 spaced below the opening, leaving a shallow space 16.

Figure 4:
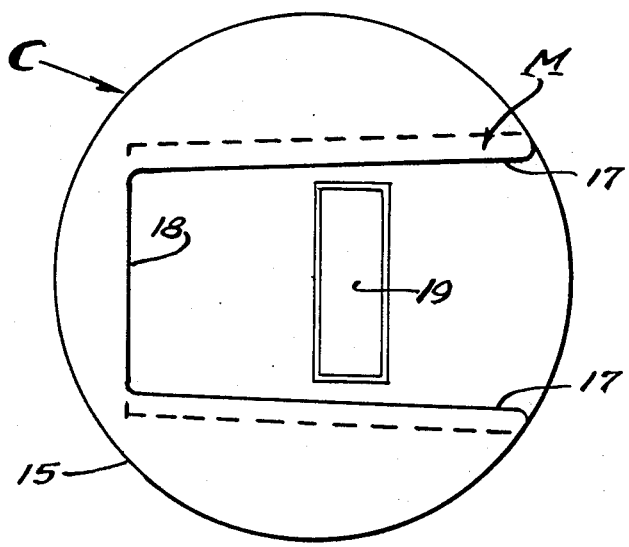
FIG. 4 is a plan view of the unencumbered closure, taken as indicated by line 4—4 on FIG. 1.

In accordance with this invention, the exterior of the top 14 is provided with mounting means M for the dispenser D, and shown herein as a laterally open guideway comprised of a pair of side rails 17, opening at one side of the top 14 and terminating with a stop 18 at the other side. A feature is that the top is flat surrounding the mounting means M and its rails 17, whereby stacking of the containers is not hampered. Another feature of the top 14 is a breakaway portion 19 (see FIGS. 1 and 4) that is provided to establish an opening 20 from the container and into the dispenser D (see FIG. 6).

Figure 2:
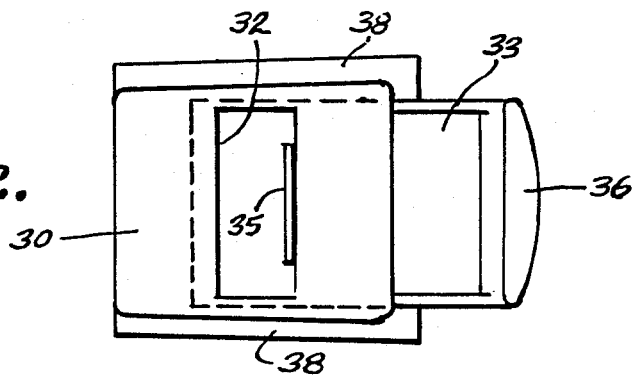
FIG. 2 is a plan view of the dispenser removed from the closure.

The dispenser D is a separate means as shown in FIG. 2, that is accommodated within the container as shown in FIG. 1, and which is installed atop the closure C as shown in FIGS. 3 and 6 (inverted in FIG. 6 in the pouring mode). The dispenser D is comprised of a box-like housing 30 having a first inside opening 31 registering with opening 20 of closure C to receive product when installed as shown in FIGS. 3 and 6, and with a second outside opening 32 offset toward the stop 18 to deliver product. A manually operable slide 33 is moved from a retracted position as shown in FIGS. 2 and 3 to an operated position as shown in FIG. 6, there being a return spring means 34 to return the slide 33 from stop 18 to a stop ridge 35 on the slide that operates within the opening 32 (see FIG. 2). A finger 36 at the open side of rails 17 is manually depressible to shift the slide so as to move a chamber 37 thereof from the first opening 31 to the second opening 32, thereby to dispense product as indicated by the arrow in FIG. 6. As shown, there are opposite side ribs 38 on the housing 30 to slideably engage with the rails 17, tapered to have secure wedged engagement.

Figure 5:
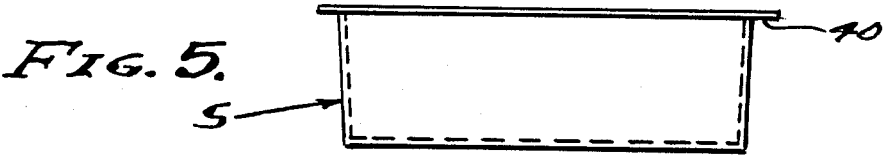
FIG. 5 is a side elevational view of the closure seal, removed from its installation as shown in FIG. 1.

A feature of this invention is the seal S as shown in FIGS. 1 and 5, comprised of a circular cup-shaped member that depends into the space 16 to carry the dispenser D. In practice, the seal S is an inverted hat shape of plastic having a rim 40 to engage between the neck 11 and underside of top 14. When the closure is removed to open the container, the dispenser D is withdrawn from the seal S and the seal discarded, whereupon the dispenser is installed atop the closure C as shown in FIGS. 3 and 6.

Having described only the typical preferred form and application of my invention, I do not wish to be limited or restricted to the specific details herein set forth, but wish to reserve to myself any modifications or variations that may appear to those skilled in the art, as set forth within the limits of the following claims.

I claim:

1. A closure and dispenser combination for dispensing measured product from a container and including;
    the closure having means replaceably securing it to an open neck of the container and having a top with mounting means at the exterior of the closure, there being an opening in the top of the closure,
    a removable seal of inverted hat shape between the top of the closure and the open end of the container and having a portion depending within the neck of the container from a rim thereof engaged between the top of the closure and the open neck of the container to seal therewith,
    the dispenser being separate from the closure and accommodated within the seal portion depending within the container and removable therefrom when the closure is removed from the container and received by the mounting means at the exterior of the closure when the closure is replaced on the container and having a slide with a product receiving chamber shiftable between a first interior opening aligned with the aforesaid opening in the top of the closure and a second offset exterior opening to discharge the product.

2. The closure and dispenser combination as set forth in claim 1, wherein the means replaceably securing the closure to the container is a screw thread between a skirt on the closure and the neck of the container.

3. The closure and dispenser combination as set forth in claim 1, wherein the mounting means at the exterior of the closure is a pair of spaced rails securing opposite side ribs on the dispenser to install the same at the exterior of the closure.

4. The closure and dispenser combination as set forth in claim 1, wherein the closure has a breakaway portion for removal to establish the opening in the top of the closure.

5. The closure and dispenser combination as set forth in claim 1, wherein the seal is removable to expose the opening in the top of the closure.

6. The closure and dispenser combination as set forth in claim 1, wherein the dispenser has a spring means returning the slide chamber to the first interior opening aligned with the opening in the top of the closure.

7. The closure and dispenser combination as set forth in claim 1, wherein the means replaceably securing the closure to the container is a screw thread between a skirt of the closure and a neck of the container, wherein the mounting means at the exterior of the closure is a pair of spaced rails securing opposite side ribs on the dispenser to install the same at the exterior of the closure, wherein the closure has a breakaway portion for removal to establish the opening in the top of the closure, and wherein the dispenser has a spring means returning the slide chamber to the first interior opening aligned with the opening in the top of the closure.

* * * * *